United States Patent
Parker

(10) Patent No.: US 11,734,072 B2
(45) Date of Patent: Aug. 22, 2023

(54) STREAM-BASED JOB PROCESSING

(71) Applicant: Nuvolo Technologies Corporation, Paramus, NJ (US)

(72) Inventor: Collin Parker, Chatsworth, CA (US)

(73) Assignee: Nuvolo Technologies Corporation, Paramus, NJ (US)

(*) Notice: Subject to any disclaimer, the term of this patent is extended or adjusted under 35 U.S.C. 154(b) by 40 days.

(21) Appl. No.: 17/139,637

(22) Filed: Dec. 31, 2020

(65) Prior Publication Data

US 2022/0206856 A1 Jun. 30, 2022

(51) Int. Cl.
*G06F 9/50* (2006.01)
*G06F 9/48* (2006.01)
*G06F 111/02* (2020.01)
*G06F 30/10* (2020.01)
*H04L 67/01* (2022.01)

(52) U.S. Cl.
CPC .............. *G06F 9/5027* (2013.01); *G06F 9/48* (2013.01); *G06F 9/4806* (2013.01); *G06F 9/4881* (2013.01); *G06F 9/5005* (2013.01); *G06F 9/5038* (2013.01); *G06F 30/10* (2020.01); *G06F 2111/02* (2020.01); *H04L 67/01* (2022.05)

(58) Field of Classification Search
CPC ........ G06F 9/48; G06F 9/4806; G06F 9/4881; G06F 9/50; G06F 9/5005; G06F 9/5027; G06F 9/5038
See application file for complete search history.

(56) References Cited

U.S. PATENT DOCUMENTS

| | | |
|---|---|---|
| 6,341,291 B1 | 1/2002 | Bentley et al. |
| 8,155,943 B2 | 4/2012 | Nasle |
| 8,818,769 B2 | 8/2014 | Trainer et al. |
| 9,454,623 B1 | 9/2016 | Kaptsan |
| 10,019,668 B1 * | 7/2018 | Woo .......................... G06N 3/08 |
| 10,121,286 B2 | 11/2018 | Alsaffar et al. |
| 10,445,438 B1 | 10/2019 | Motonaga et al. |

(Continued)

OTHER PUBLICATIONS

Ekanayake et al, "MapReduce for Data Intensive Scientific Analysis", Fourth IEEE International Conference on eScience, 2008, IEEE, pp. 277-284 (Year: 2008).*

(Continued)

*Primary Examiner* — Charles M Swift
(74) *Attorney, Agent, or Firm* — Mintz Levin Cohn Ferris Glovsky and Popeo, P.C.

(57) ABSTRACT

Systems and techniques for managing and executing digital workflows are described. A technique described includes obtaining a job record from a job queue from a first server; assigning a node associated with a second server to handle a task indicated by the job record; operating, at the second server, a first action block in the node to produce output results in response to executing the task and to forward the output results to batch blocks; operating, at the second server, the batch blocks in the node to respectively accumulate different batch groups of the output results; operating, at the second server, the batch blocks in the node to respectively forward the different batch groups of the output results to respective second action blocks; and operating, at the second server, the second action blocks in the node to respectively process the different batch groups of the output results.

21 Claims, 8 Drawing Sheets

(56) References Cited

U.S. PATENT DOCUMENTS

| | | | |
|---|---|---|---|
| 2007/0186160 A1 | 8/2007 | McArdle et al. | |
| 2008/0172605 A1 | 7/2008 | Smith | |
| 2010/0169272 A1 | 7/2010 | Labatte et al. | |
| 2015/0106325 A1* | 4/2015 | Cole | G06F 16/24556 707/600 |
| 2016/0246899 A1 | 8/2016 | Hirschtick et al. | |
| 2016/0328421 A1 | 11/2016 | Sarratori et al. | |
| 2017/0147717 A1 | 5/2017 | Chen et al. | |
| 2018/0113878 A1 | 4/2018 | Duggal et al. | |
| 2019/0213287 A1 | 7/2019 | Ye et al. | |
| 2020/0285514 A1* | 9/2020 | Ghare | G06F 9/505 |
| 2020/0351337 A1* | 11/2020 | Calmon | G06F 9/45558 |
| 2021/0073449 A1 | 3/2021 | Segev et al. | |
| 2021/0383037 A1 | 12/2021 | Segev et al. | |
| 2022/0092225 A1 | 3/2022 | Parker et al. | |
| 2022/0092834 A1 | 3/2022 | Ye et al. | |
| 2022/0171892 A1 | 6/2022 | Ho et al. | |
| 2022/0171893 A1 | 6/2022 | Ye et al. | |
| 2022/0188472 A1 | 6/2022 | Parker | |
| 2022/0206445 A1 | 6/2022 | Reichl et al. | |
| 2022/0214999 A1 | 7/2022 | Yadav et al. | |
| 2022/0215604 A1 | 7/2022 | Ho et al. | |

OTHER PUBLICATIONS

Condie et al, "Online Aggregation and Continuous Query support in MapReduce", SIGMOD'10, Jun. 6-11, 2010, Indianapolis, Indiana, USA, ACM, pp. 1115-1118 (Year: 2010).*

Github.com, [online] "Deepzoom (php library)", Daniel-KM Library Deepzoom, retrieved on Aug. 17, 2020, retrieved from URL: https://github.com/Daniel-KW/LibraryDeepzoom, 4 pages.

Github.com, [online] "TiledSharp", Marshallward/TiledSharp, retrieved on Aug. 17, 2020, retrieved from URL: https://github.com/marshallward/TiledSharp, 4 pages.

Stackexchange.com, [online] "If Geographic Coordinates are unprojected coordinates, how can GIS soft wares display such unprojected data in a plane?", Geographic Information Systems, retrieved on Jun. 2, 2020, retrieved from URL: https://gis.stackexchange.com/questions/146321/if-geographic-coordinates-are-unprojected-coordinates-how-can-gis-softwares-dis#:-:text, 2pages.

Wikipedia, "Map projection", retrieved from URL: https://en.wikipedia.org/w/index.php?title=Map_projection&oldid=955953903, 2020, 16 pages.

Wikipedia, "Spatial reference system", retrieved from URL: https://en.wikipedia.org/w/index.php?title=Spatial_reference_system&oldid=956142752, 2020, 4 pages.

Wikipedia, "Tiled web map", retrieved from URL: https://en.wikipedia.org/w/index.php?title=Tiled_web_map&oldid=956139437, 2020, 3 pages.

Chen et al. (2019) "Floor-SP: Inverse CAD for Floorplans by Sequential Room-Wise Shortest Path", IEEE International Conference on Computer Vision (ICCV), 10 pages.

Muller et al. (2006) "Procedural Modeling of Buildings", Association for Computing Machinery, Inc., 25(3):614-623.

Zhu et al. (Dec. 19, 2013) "A New Reconstruction Method for 3D Buildings From 2D Vector Floor Plan", HAL Open Science, pp. 1-14(15 pages).

* cited by examiner

STREAM-BASED JOB PROCESSING

BACKGROUND

This description relates to distributed processing associated with digital workflows for enterprise operations including computer aided design (CAD) related and project related workflows.

CAD software has been developed and used to generate two-dimensional (2D) or three-dimensional (3D) representations of various things including objects and buildings. After designing, a CAD program can output a CAD document that is based on a file format, such as Drawing Exchange Format (DXF), DWG (AutoCAD drawing database file), and DGN (a file format created by the Open Design Alliance and Bentley Systems). Other file types are possible. A CAD document can provide data representations of one or more real-world constructs. These data representations can be, for example, 2D floorplans for a building, where the floorplans include different outlines for each room of a floor. Data representations of real-world constructs in separate CAD files can be encoded and arranged differently based on preferences and design choices used in a CAD program.

SUMMARY

Systems and techniques for managing and executing digital workflows for enterprise operations are described. A cloud computing platform can provide an environment for managing and executing such workflows. In the environment, jobs can be created and inserted into a job queue. A server system can pull a job from the job queue for stream-based execution on a processing node. The processing node, for example, can include an internal pipeline engine that handles bulk data in batches to minimize memory usage and maximize performance.

A technique described herein includes obtaining a job record from a job queue from a first server system; assigning a node associated with a second server system to handle a task indicated by the job record; operating, at the second server system, a first action block in the node to produce a plurality of output results in response to executing the task and to forward the plurality of output results to a plurality of batch blocks; operating, at the second server system, the batch blocks in the node to respectively accumulate different batch groups of the output results; operating, at the second server system, the batch blocks in the node to respectively forward the different batch groups of the output results to respective second action blocks; and operating, at the second server system, the second action blocks in the node to respectively process the different batch groups of the output results. Other implementations include corresponding systems, apparatus, and computer programs to perform the actions of methods defined by instructions encoded on computer readable storage.

These and other implementations can include one or more of the following features. Implementations can include operating, at the second server system, a link block in the node to copy the plurality of output results from the first action block to the plurality of batch blocks. The job record can include an attachment identifier. Implementations can include operating, at the second server system, the first action block in the node to retrieve one or more files associated with the attachment identifier. Various examples of files include a CAD document file and a Microsoft project file. Other types of files are possible.

The batch groups can include a first batch group of the output results and a second batch group of the output results. Implementations can include operating, at the second server system, the batch blocks in the node to respectively accumulate different second batch groups of the output results; operating, at the second server system, the batch blocks in the node to respectively forward the different second batch groups of the output results to the second action blocks; and operating, at the second server system, the second action blocks in the node to respectively process the different second batch groups of the output results.

Implementations can include operating, at the second server system, the batch blocks to generate a signal to throttle forwarding of output results from the plurality of output results from the first action block. In some implementations, the signal is generated based on forwarding a predetermined number of output results to a second action block. Operating the second action blocks in the node to respectively process the different batch groups of the output results can include operating the second action blocks to respectively upload the batch groups of the output results to a data store associated with the first server system.

A server system can include a processor; and a computer-readable storage medium coupled with the processor, wherein the computer-readable storage medium comprising a program for execution by the processor, the program including instructions which, when executed by the processor, cause the processor to perform operations. The operations can include obtaining a job record from a job queue; assigning a node to handle a task indicated by the job record; operating a first action block in the node to produce a plurality of output results in response to executing the task and to forward the plurality of output results to a plurality of batch blocks; operating the batch blocks in the node to respectively accumulate different batch groups of the output results; operating the batch blocks in the node to respectively forward the different batch groups of the output results to respective second action blocks; and operating the second action blocks in the node to respectively process the different batch groups of the output results.

Particular embodiments of the subject matter described in this specification can be implemented to realize one or more of the following advantages. The techniques and systems can minimize memory usage and maximize performance. The techniques and systems can increase the efficiency of a system executing jobs from a job queue. For example, they can increase job throughput. The techniques and systems can also facilitate massive data transfers from and to a cloud computing platform. The techniques and systems can also adapt to varying data transfer rates and potential platform delays when uploading output results to a cloud computing platform.

The details of one or more implementations are set forth in the accompanying drawings and the description below. Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
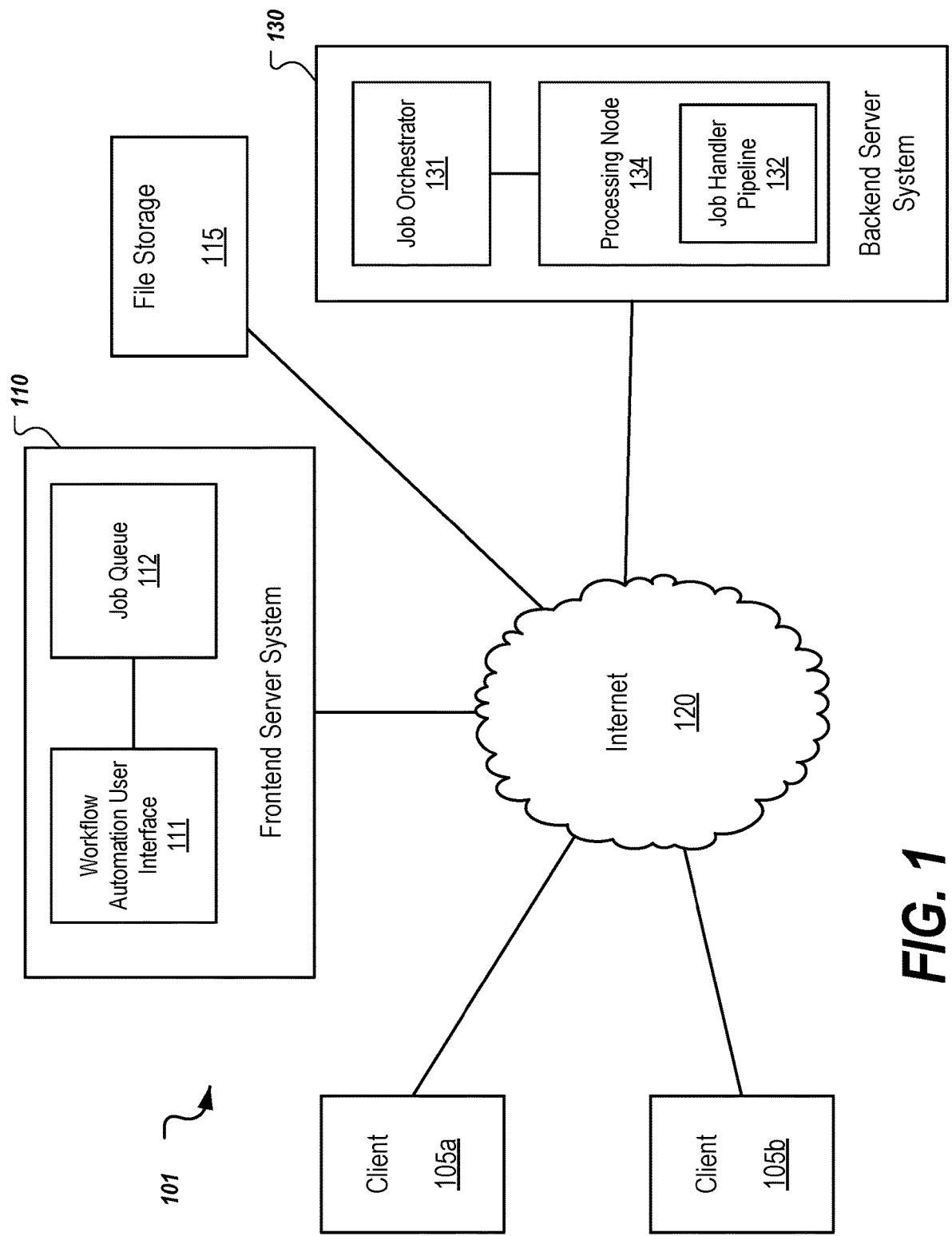
FIG. 1 shows an example of a network architecture that can be used to manage and execute digital workflows for enterprise operations.

FIG. 1 shows an example of a network architecture 101 that can be used to manage and execute digital workflows for enterprise operations. The network architecture 101 includes clients 105a, 105b, server systems 110, 130, file storage 115, and a network such as the Internet 120. Server systems such as a frontend server system 110 and a backend server system 130 can include one or more computing devices, one or more cloud computing platform (public or private), or combination thereof. Other types of server systems are possible.

The frontend server system 110 can be part of a cloud computing platform that provides an environment for managing digital workflows for enterprise operations. In the environment, jobs can be created and inserted into a job queue 112 via a workflow automation user interface 111. Clients 105a-b, for example, can interact with the frontend server system 110 using the workflow automation user interface 111 to create jobs and view job results. The backend server system 130 can include a job orchestrator 131 and a processing node 134. The processing node 134 can include a job handler pipeline 132 to handle one or more jobs. The job orchestrator 131 can pull a job from the job queue 112 and assign the processing node 134 to handle the job. The backend server system 130 can include one or more processing nodes 134 to handle jobs from the job orchestrator 131.

Job-related data input and output can be stored within the file storage 115. In some implementations, the file storage 115 resides within a cloud-based storage provider that provides file storage over a public network such as the Internet 120. In some implementations, the file storage 115 resides on the same private network as the frontend server system 110. In some implementations, one or more of the server systems 110, 130 include a file storage such as file storage 115.

In some implementations, the clients 105a-b can use a web browser to interact with a CAD program, audit program, or space management program that creates and executes jobs via the server systems 110, 130. In some implementations, a client 105a-b can create a job via the frontend server system 110 such that the backend server system 130 retrieves a CAD document from the file storage 115 and renders output tiles to the file storage 115 for subsequent display by a client 105a-b.

Figure 2:
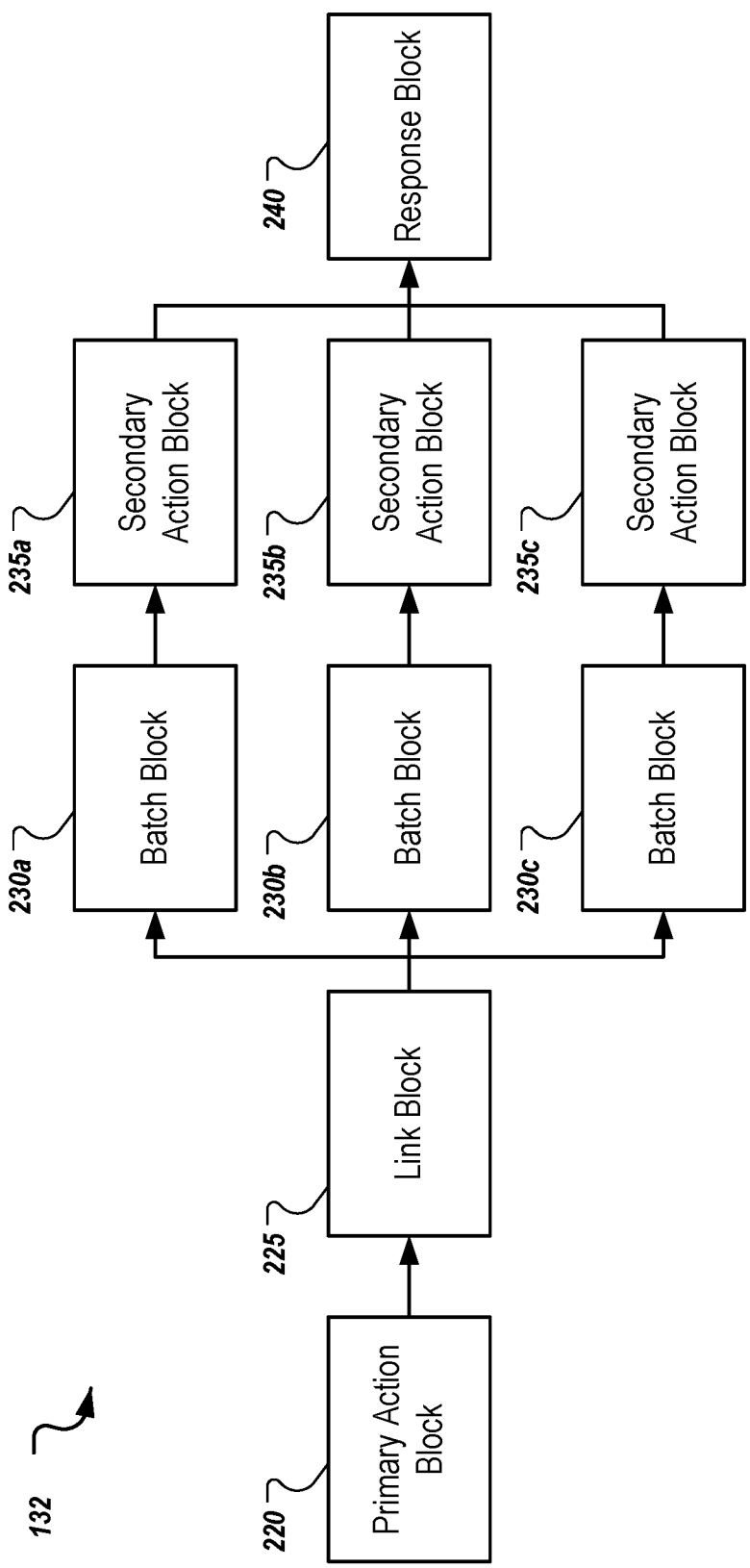
FIG. 2 shows an architecture of an example of the job handler pipeline of FIG. 1.

FIG. 2 shows an architecture of an example of the job handler pipeline 132 of FIG. 1. In some implementations, a server system can include a processor to execute the processing node functionality including the job handler pipeline 132. In some implementations, the job handler pipeline 132 is configured to handle bulk data in batches to minimize memory usage and maximize performance. The job handler pipeline 132, in this example, includes primary action block 220, link block 225, batch blocks 230a-c, secondary action blocks 235a-c, and response block 240. A job, which corresponds to a job record, can be provided to the job handler pipeline 132. A job record can include an attachment identifier. In some implementations, the attachment identifier is an identifier such as a number or string that enables a recipient to retrieve the corresponding attachment. In some implementations, the attachment identifier is a uniform resource identifier (URI).

A primary action block 220 can be configured to execute code and outputs one or more results. In some implementations, the primary action block 220 can obtain a file corresponding to an attachment identifier stored in a job record. The primary action block 220 in the job handler pipeline 132 can generate output results in response to executing a task associated with a job. The link block 225 can be configured to copy one or more results from the primary action block 220 to a batch block 230a-c. In some implementations, the link block 225 can distribute the output results among the batch blocks 230a-c for further processing by the secondary action blocks 235a-c.

Batch blocks 230a-c within the pipeline 132 can accumulate output results from the primary action block 220. The batch blocks 230a-c are associated with respective secondary action blocks 235a-c. For example, batch block 230a provides output results to secondary action block 235a. Each of the batch blocks 230a-c can be configured to hold a group of output results produced by the primary action block 220. When the number of accumulated output results reaches a predetermined threshold, the batch block 230a-c can send the group of output results to a corresponding one of the secondary action blocks 235a-c for additional processing, e.g., such as uploading to a data store associated with the cloud computing platform.

A response block 240 can aggregate outputs from the secondary actions blocks 235a-c. In some implementations, the secondary action blocks 235a-c can provide an upload identifier to the response block 240, which tracks uploaded files. When all output results produced by the primary action block 220 have been handled by the secondary action blocks 235a-c, the response block 240 can send a job complete message. In some implementations, the job complete message can include one or more identifiers for uploaded files.

FIGS. 3A, 3B, 3C, and 3D show examples of different blocks within the job handler pipeline 132 of FIGS. 1 and 2. In some implementations, a block can be a collection of one or more software routines that can be executed on circuitry such as one or more processors.

Figure 3A:
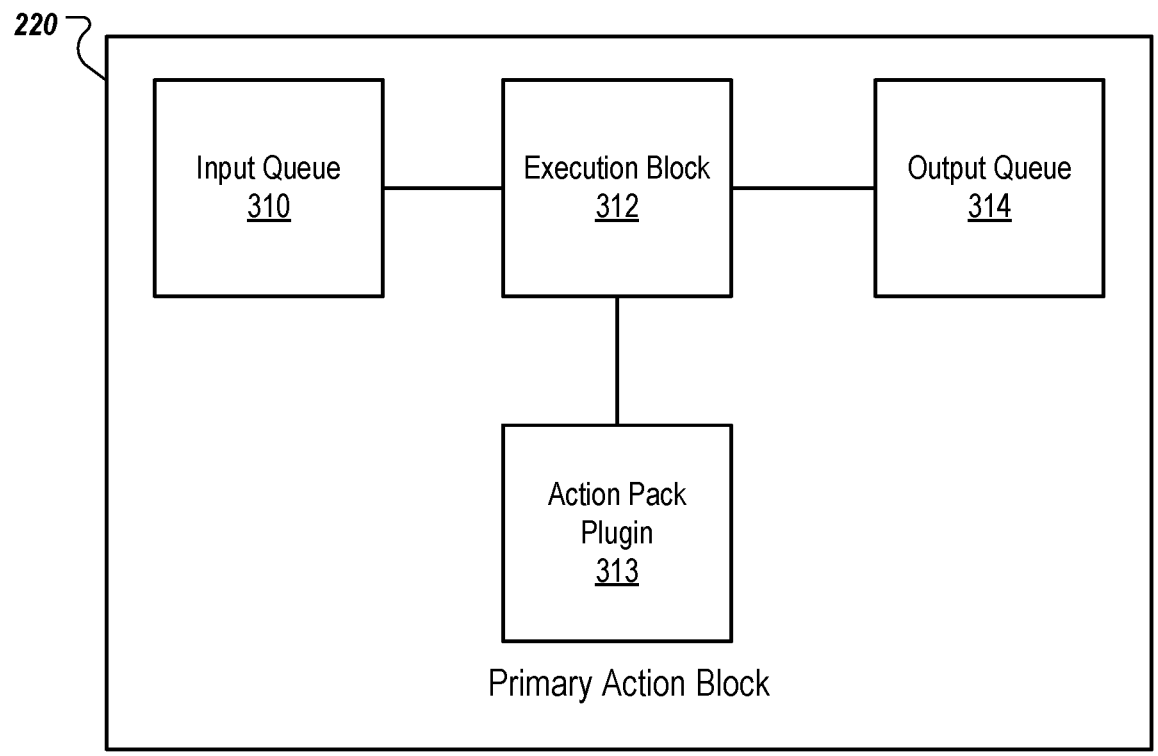
FIGS. 3A, 3B, 3C, and 3D show examples of different blocks within the job handler pipeline of FIGS. 1 and 2.

FIG. 3A shows an example of a primary action block 220. The primary action block 305 can include an input queue 310, execution block 312, action pack plugin 313, and an output queue 314. The job handler pipeline 132 can include one or more additional blocks to monitor a job queue such as job queue 112, retrieve a job record from the job queue, and insert the job record into the input queue 310. In some implementations, a retrieved job record can be converted into a job event that is associated with a data structure called a stream record. The stream record can include job-related information such as a job identifier, attachment identifier, action pack plugin identifier, and an execution context structure. In some implementations, an execution context structure can include input information for the plugin, input storage location, output storage location, and next block information (e.g., pointer to the next block). The execution block 312 can obtain a job record from the input queue 310 and execute a plugin identified by the job record such as action pack plugin 313. The action pack plugin 313 can produce output results. The output results can be stored in the output queue 314. In some implementations, action pack plugin 313 is configured to execute CAD-related software. For example, an action pack plugin 313 can be configured to render a CAD drawing. The output results can include different tiles for display that are associated with the CAD drawing.

Figure 3B:
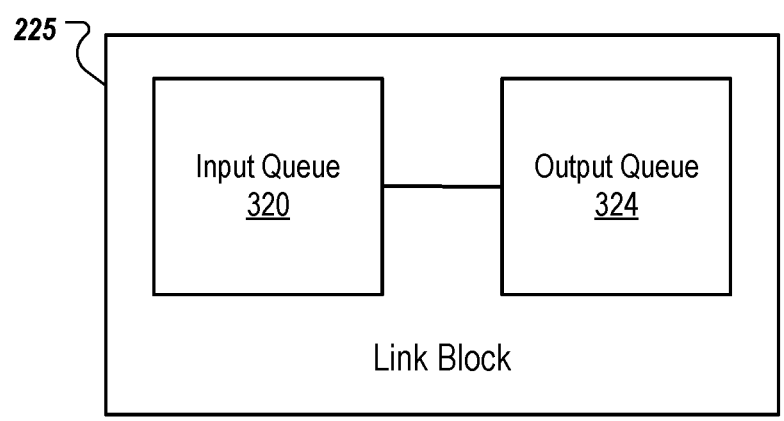

FIG. 3B shows an example of a link block 225. The link block 225 can include an input queue 320 and an output queue 324. The link block 225 can be configured to retrieve one or more output results from the primary action block 220 or accept one or more output results from the primary action block 220. The output results can be placed in the input queue 320. In some implementations, the primary action block 220 can transfer output results directly into the input queue 320. The link block 225 can transfer the results from the input queue 320 to the output queue 324 before distributing the output results among the batch blocks 230a-c.

Figure 3C:
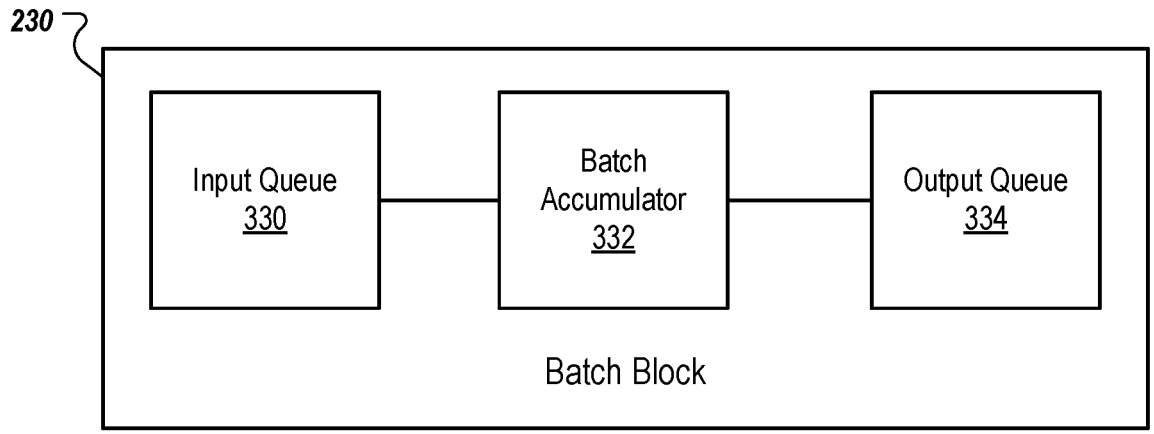

FIG. 3C shows an example of a batch block 230. The batch block 230 includes an input queue 330, batch accumulator 332, and output queue 334. The input queue 330 of the batch block 230 can be configured to retrieve one or more output results from the link block 225. The batch accumulator 332 can be configured to accumulate the output results. The batch block 230 can determine when a corresponding secondary action block 235 is ready to receive a batch of output results. When ready, the batch block 230 can transfer the batch of output results from the batch accumulator 332 to the output queue 334 for subsequent sending to the secondary action block 235.

In some implementations, the batch blocks 230 can be configured to throttle forwarding of output results from the primary action block 220. In some implementations, each of the batch blocks 230 can be configured to send a throttle signal to the primary action block 220 to change output result forwarding. For example, if a batch block 230 sends a throttle signal indicating that it has no room for additional results, the primary action block 220 can forward output results to one of the other batch blocks. In some implementations, the batch accumulator 332 can store a predetermined amount of output results such as tiles produced by the primary action block 220 in response to processing a CAD-related input. A throttle signal to slow or stop result forwarding can be sent when the batch accumulator 332 has reached or is about to reach the predetermined amount of output results.

Figure 3D:
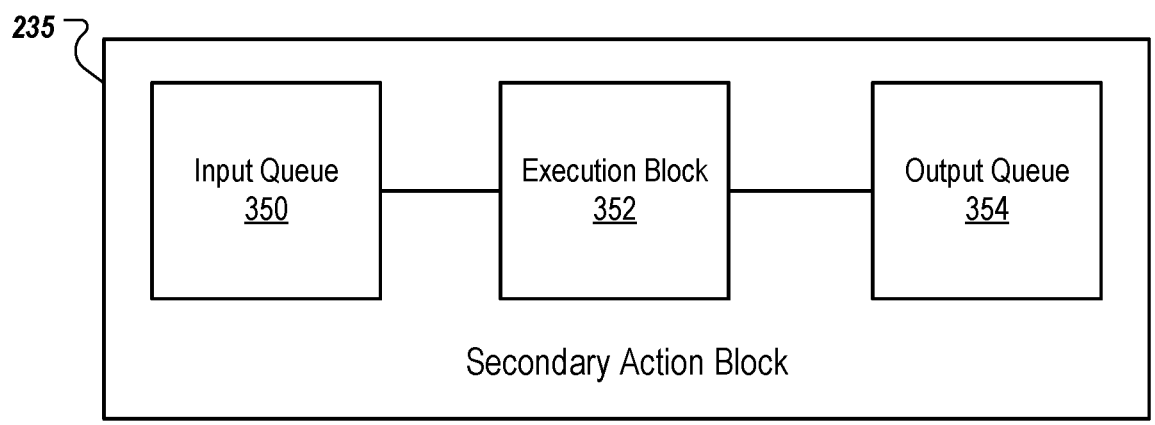

FIG. 3D shows an example of a secondary action block 235. The secondary action block 235 can include an input queue 350, execution block 352, and an output queue 354. The input queue 350 can be configured to receive a batch of output results from a batch block 230. The execution block 352 can be configured to execute code based on results stored in the input queue 350 and produce results that are stored in the output queue 354. For example, the execution block 352 can retrieve the batch of output results from the input queue 350, upload the output results to a networked-based cloud system, and provide a status result to the output queue 354. The status result can include an upload identifier, confirmation of the upload, or both.

Figure 4:
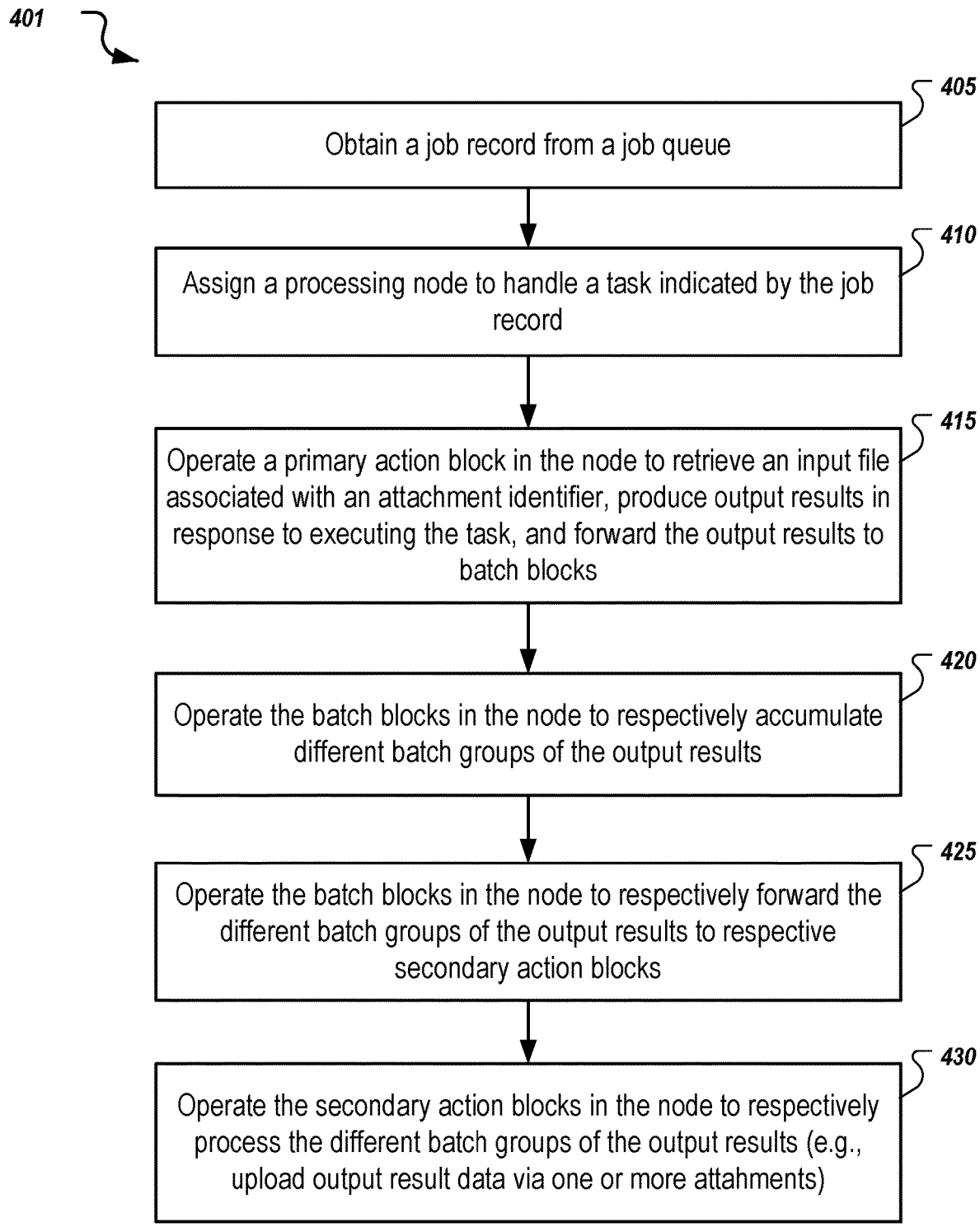
FIG. 4 shows a flowchart of an example of a process for operating a job pipeline.

FIG. 4 shows a flowchart of an example of a process 401 for operating a job pipeline. The process 401 can be performed by a server system such as backend server system 130 of FIG. 1 which can use one or more processors (e.g., processor 702 of FIG. 7). At 405, the server system obtains a job record from a job queue. At 410, the server system assigns a processing node to handle a task indicated by the job record. In some implementations, the job record includes an attachment identifier, which can be used to retrieve an input file for processing. The processing node can be associated with a server system. In some implementations, the server system assigns one or more threads to the processing node. In some implementations, the processing node is a Node.js process that runs in a container. The processing node can be configured to trigger an event based on receiving a job record, where the event triggers one or more blocks to handle the job record.

At 415, the server operates a primary action block in the node to retrieve an input file associated with an attachment identifier, produce output results in response to executing the task, and forward the output results to batch blocks. Various examples of input files include a CAD document file or a Microsoft project file. Other types of files are possible. In some implementations, a link block in the node is configured to copy output results from the primary action block to batch blocks. The link block can distribute output results among the batch blocks. The distribution can be based on a load balancing mechanism.

At 420, the server operates the batch blocks in the node to respectively accumulate different batch groups of the output results. At 425, the server operates the batch blocks in the node to respectively forward the different batch groups of the output results to respective secondary action blocks. In some implementations, the batch blocks are configured to generate a signal to throttle forwarding of output results from the primary action block. In some implementations, a batch block generates a throttle signal after forwarding a predetermined number of output results to a secondary action block associated with the bath block.

At 430, the server operates the secondary action blocks in the node to respectively process the different batch groups of the output results. Operating the secondary action blocks in the node to respectively process the different batch groups of the output results can include operating the secondary action blocks to respectively upload the batch groups of the output results to a data store, such as a cloud storage associated with a server that originated the job record. In some implementations, a secondary action block uploads an output result data via an attachment.

Figure 5:
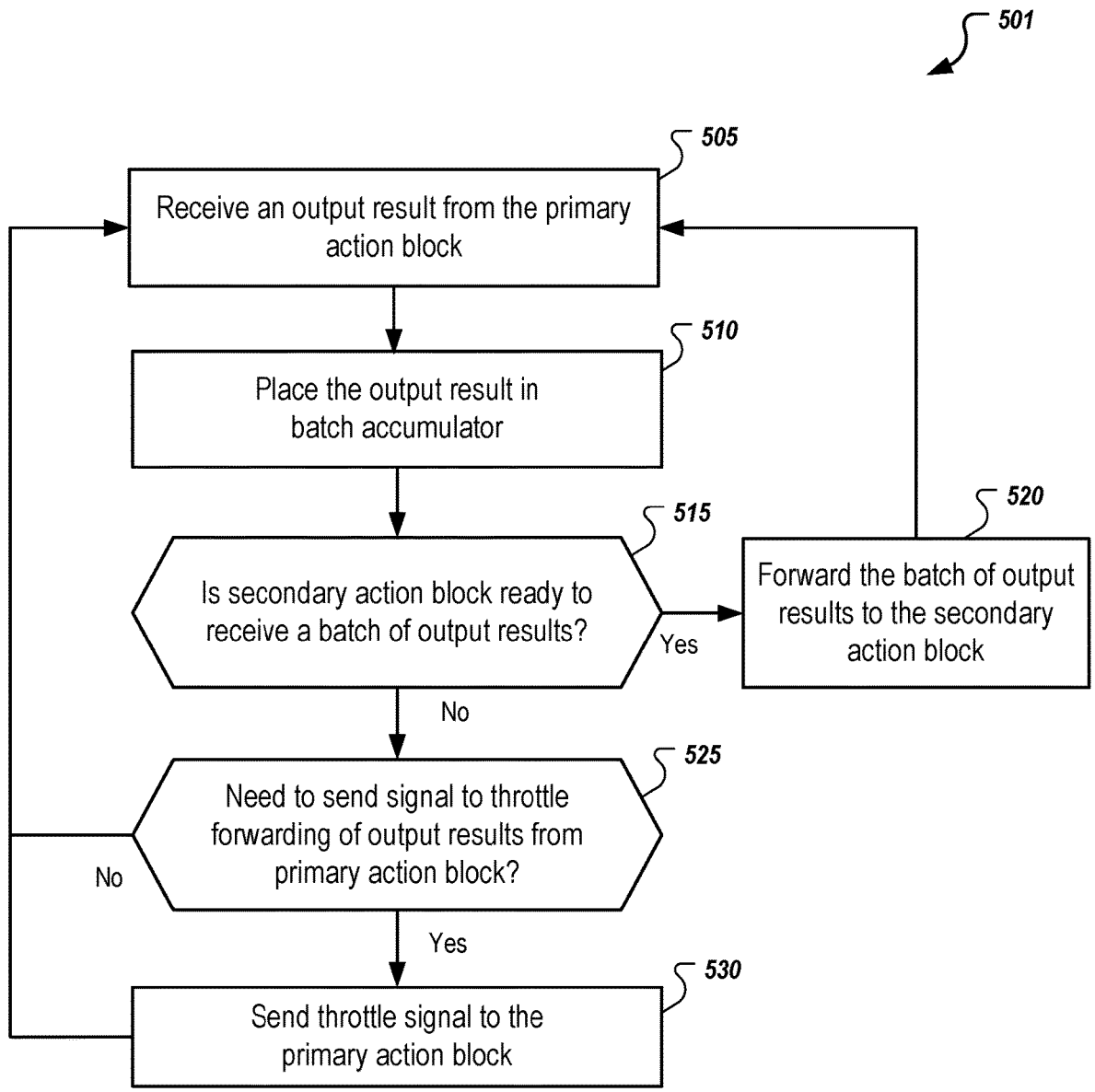
FIG. 5 shows a flowchart of an example of a process performed by a batch block within a job handler pipeline.

FIG. 5 shows a flowchart of an example of a process 501 performed by a batch block such as a batch block 230a-c of FIG. 2 within a job handler pipeline 132. At 505, the batch block receives an output result from a primary action block. At 510, the batch block places the output result in a batch accumulator. In some implementations, the batch accumulator includes a data buffer.

At 515, the batch block determines whether the secondary action block is ready to receive a batch of output results. In some implementations, determining whether the secondary action block is ready to receive a batch of output results includes polling the secondary action block to determine whether it is ready for more. In some implementations, determining whether the secondary action block is ready to receive a batch of output results includes receiving a ready signal from the secondary action block. In some implementations, determining whether the secondary action block is ready to receive a batch of output results includes receiving a completion signal from the secondary action block with respect to a previously sent batch of results. If the secondary action block is ready to receive a batch of output results, the batch block at 520 forwards the batch of output results to the secondary action block and then continues to 505 to receive additional output results.

If the secondary action block is not ready to receive a batch of output results, then at 525, the batch block determines whether to send a signal to throttle forwarding of output results from the primary action block to the batch block. If throttling is not required, the batch block continues at 505 to receive the next output result. If throttling is required, then at 530, the batch block sends a throttle signal to the primary action block and continues at 505 to receive the next output result.

Figure 6:
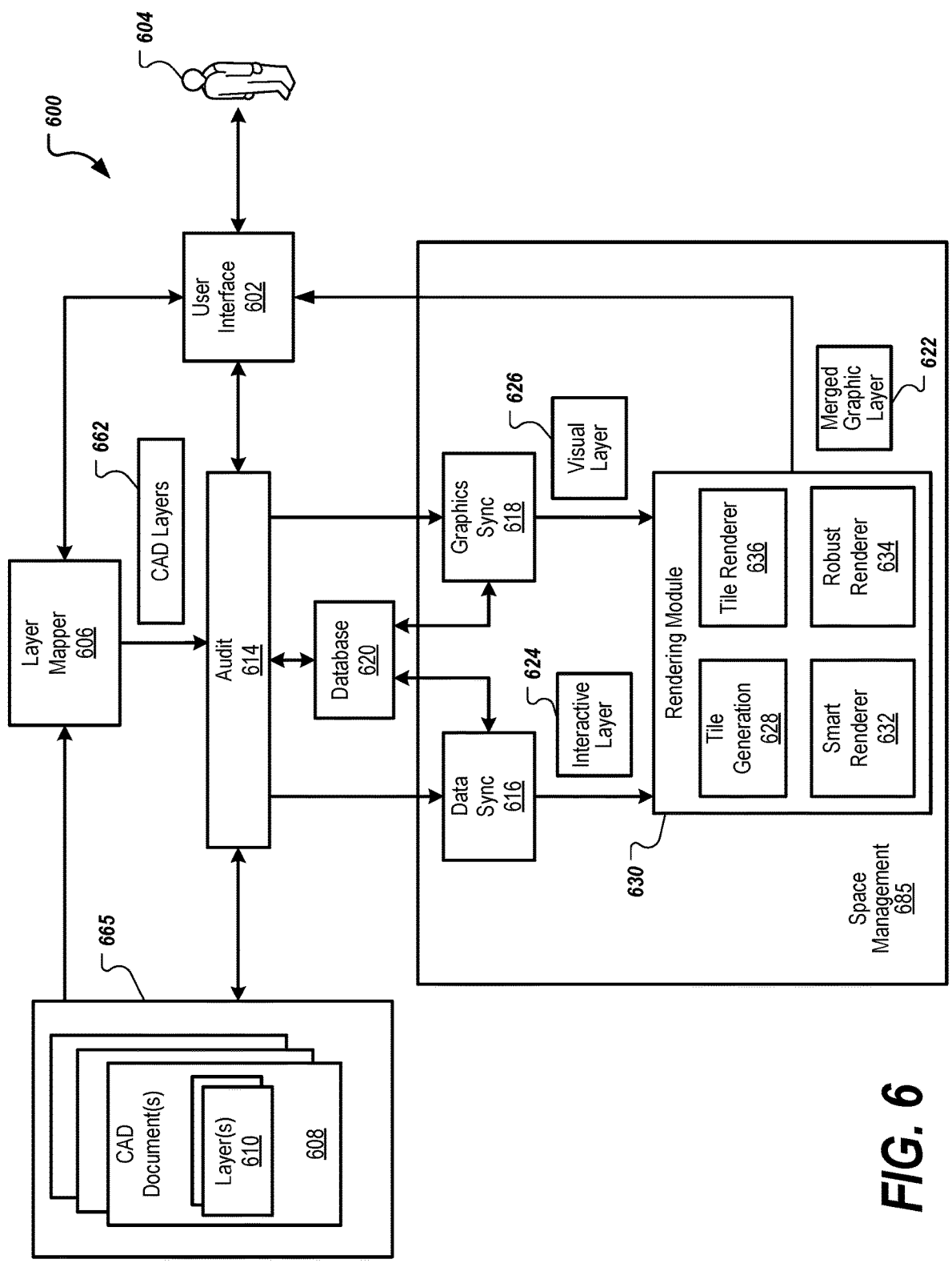
FIG. 6 shows an example of a computing system configured to process one or more CAD documents.

FIG. 6 shows an example of a computing system 600 configured to process one or more CAD documents 608. The system 600 includes a user interface 602 that interacts with a user 604, e.g., receives input from a user 604, or provides output to the user 604. The user interface 602 can graphically render output, such as information based on the CAD documents 608, to the user 604. The system 600 can include one or more computing devices, including a device operable to display a user interface 602 such as a graphical user interface (GUI), e.g., a desktop computer with a display monitor, a laptop computer, a tablet device, a smartphone, a networked client/mobile device, or other related devices. A computing device can be operable to exchange data communications with other devices (e.g., client and server devices) of the system 600. Further, the computing system 600 can include or interact with one or more server systems such as the server systems 110, 130 of FIG. 1.

A CAD document 608 can include one or more layers 610. A layer 610 of a respective CAD document 608 can correspond to an item of a geographic entity, such as a building or physical location. For example, each of the layers 610 can correspond to a respective item such as a floorplan of a floor in the building, a room of a floor in the building that is represented by the floorplan, or an interior or exterior wall of a room included in the floorplan. Additional details about individual layers and corresponding items that can be associated with a given layer are described in more detail below. A CAD document 608 can include information about the regions represented by a floorplan, e.g., a region's space code, space name, and space type. In some implementations, floorplan is a map for an area, such as a building, park, school, or stadium, and can include information for multiple different levels or a single level. A floorplan can include data for a single level within a multilevel area, e.g., a single floor in a building. In some examples, a floorplan includes data for a portion of an area, e.g., part of a floor within a building or a portion of a park.

In some implementations, the system 600 is configured to implement a framework for interpreting and extracting graphics and data elements of a CAD document 608 to digitally render the items of a building for presentation to the user 604. The graphics and data elements cooperate to present a digital representation of the items in an application program used to generate the CAD document 608. In some implementations, the CAD document 608 can be a file generated by a CAD program. The CAD document 608 can be based on a file format such as DXF, DWG, and can encode data representations of real-world items, such as the example items described above.

Data representations of real-world items in separate or distinct CAD documents 608, or even across distinct layers of a CAD document, can be encoded and arranged differently based on design preferences and drafting protocols used in the CAD program. Because these data representations are often encoded in a variety of ways, extracting specific types of information from a CAD document can be challenging. To address these challenges, the system 600 can include a set of modules which can be configured to execute a subset of the techniques for implementation of the framework used to extract graphics and data elements of a CAD document or present at least some of the extracted graphics, data elements, or both. These modules can be implemented as computer programs that are executable by one or more processors.

The system 600 includes a module called a layer mapper 606 which can receive one or more CAD documents 608. Each CAD document 608 can include one or more layers 610. In some implementations, the layer mapper 606 obtains the CAD documents 608 based on an input from user 604 which is received by way of user interface 602. In some implementations, the layer mapper 606 can receive or obtain the CAD documents 608 independent of input from user 604 but execute its file audit and data processing operations based on user input received by way of user interface 602.

In some implementations, the layer mapper 606 automatically imports the CAD documents 608 from a file storage 665 and automatically executes its layer mapping and data processing operations. The file storage 665 can include a computer-readable medium. The file storage 665 can be internal or external to the system 600. In some implementations, the file storage 665 includes a database 620. The database 620 can include one or more database tables for storing information about space hierarchies of a geographic location. The space hierarchies may define a physical layout of an area, office, campus, site, or floor of the geographic location. In some implementations, the CAD documents 608 are stored within the database 620. In some implementations, the database 620 resides in a memory.

The layer mapper 606 can be configured to obtain one or more of the CAD documents 608 and generate a layer mapping file based on processes performed on the received CAD documents 608. In some implementations, the processes can be executed by the layer mapper 606 based on a mapping template, user input from user 604, or both. In some implementations, the layer mapper 606 generates a layer mapping file based on instructions or commands specified by a space/system administrator ("space admin") that indicate operations to be performed on the CAD documents 608. In some cases, the space admin can be the same as user 604 or a different user of the system 600. The instructions can define or indicate layers of the CAD documents 608 as well as computer-aided facility management (CAFM) layers stored among database tables of the database 620.

The layer mapper 606 can select a mapping template that defines protocols for aggregating sets of data values of the different layers with respect to instructions and database values of CAFM layers as indicated by a space admin. For example, the layer mapper 606 can receive layer data for multiple layers of a CAD document 608, where the layer data specifies information for items such as hallways, offices on a floor, conference rooms, restrooms, types of furniture in the offices, locations of security cameras on the floor, or capabilities of various equipment such as network devices such as routers or Wi-Fi hotspots, printers, or copiers on the floor. The layer mapper 606 can use the template protocols to aggregate values for types of office furniture for a particular office while, for example, filtering out data values that indicate locations of security cameras on a floor.

More specifically, for one or more CAD documents 608, the layer mapper 606 can map portions of the layer data for different layers, such as furniture in the offices, to a hierarchy of CAFM layers (e.g., indicating each office on a floor), which can be defined in the database 620, to produce a grouping of CAD layers 662. For example, the grouping of CAD layers 662 can represent a group of offices on the 9th floor of a building along with each item of furniture in each office of the group. In some implementations, the layer mapper 606 determines the mapping between the drawing layers and the CAFM layers at least by processing data values of the different drawing layers (e.g., received inputs) against the protocols defined by the mapping template and with reference to any grouping preferences indicated by the user 604 or the space admin.

The layer mapper 606, in some implementations, generates a layer mapping output represented by CAD layers 662 based on the mapping between layers of the CAD documents 608 and CAFM layers in a database table of the database 620. In some implementations, the layer mapper 606 generates a layer mapping output that aggregates information such as data values and entity records of the received inputs based on the determined mapping of the layers. The layer mapper 606 can generate a layer mapping output that groups layer types such as the offices, the Wi-Fi hotspots, and the types of office furniture for visual rendering to an end-user, e.g., user 604 or a different user.

An audit module 614 can receive CAD documents 608 including their layers 662 from the layer mapper 606. The audit module 614 can detect and resolve issues that would otherwise inhibit importation of data from the CAD document 608 to a space management module 685. The audit module 614, for example, can apply one or more rule sets to a CAD document 608 to detect issues within the CAD document before importing the contents of the document into the space management module 685. In this example, the space management module 685 includes a data sync module 616, graphics sync module 618, and rendering module 630. Other, fewer, or more modules are possible.

In some implementations, the audit module 614 can process a CAD document 608 directly in file storage 665. In some implementations, the audit module 614 can process a version of the CAD document 608 stored in a computer memory such as a random access memory. In some implementations, the audit module 614 generates an audit output based on processes performed on the received inputs. In some implementations, the audit output includes a modified CAD document. In some implementations, the audit output includes a data structure.

The audit module 614, in some implementations, can be configured to process data corresponding to each of the CAD layers 662 to identify one or more deficiencies and generate an audit output file based on the identified deficiencies. The audit module 614 can scan each of the CAD layers 662 to detect individual deficiencies that may adversely impact a CAD document importation process executed by the system 600. In some implementations, the audit module 614 can read entity records that store data values for a layer to detect deficiencies such as unclosed polylines, missing space codes, missing space names, missing space types, or invalid space types. In some implementations, the audit module 614 detects deficiencies of a CAD document in response to processing data types of a layer or entity record of the CAD document against a predefined list of deficiency codes.

The audit module 614 can be configured to automatically resolve the detected deficiencies. In some implementations, audit module 614 can be configured to generate a notification about the detected deficiencies for rendering via the user interface 602. The notification can include one or more recommendations for addressing a detected deficiency of a CAD document 608. For example, the audit module 614 can generate a notification in response to determining that a space bounded by a polyline in a CAD document 608, e.g., a polyline specified in a CAD layer 662, is missing a space type field. The audit module 614 can determine that the space most likely corresponds to an "office space" type and can generate a recommendation for adding an "office space" type to this particular space. In some implementations, the audit module 614 generates a command to automatically input a value for the missing space type.

In some implementations, the audit module 614 is configured to standardize layer data of a CAD document for processing by one or more other modules or devices of the system 600. In some implementations, the audit module 614 generates an audit output from one or more groupings of CAD layers 662 based on processes performed on each of the CAD layers 662. The audit module 614 can provide the audit output to other modules in the system 600 including a data sync module 616 and a graphics sync module 618, which can both be included in the space management module 685.

As described above, the system 600 interprets and extracts graphics and data elements of a CAD document 608 at least to digitally render certain real-world items of a building for visualization to a user 604. The data sync module 616 can be configured to extract the data elements of the CAD document 608, whereas the graphics sync module 618 can be configured to extract the graphic elements of the CAD document 608. The data sync module 616 and the graphics sync module 618 can execute its respective extraction and syncing operations based on inputs that correspond to an audit output generated by the audit module 614 and the data associated with the one or more CAD documents 608.

The data sync module 616 can execute a workflow for extracting data values of layers identified in the mapping output and for generating data structures used to stage or preview information linked to groupings of layers in the mapping output. The graphics sync module 618 can execute a workflow for reading and exporting graphical (or spatial) elements of layer data for each of the layers in a grouping specified by the mapping output. In some implementations, to export this graphical data of the layers, the graphics sync module 618 calculates dimensional bounds that are used to generate layers including an interactive layer 624 and a visual layer 626. In some implementations, the interactive layer 624 is represented with a format for encoding geographic data structures such as GeoJSON, which is standardized by RFC 7946 of the Internet Engineering Task Force (IETF). In some implementations, the visual layer 626 is represented with graphics format such as scalable vector graphics (SVG). Other format types are possible. In some implementations, the respective outputs of the data sync module 616 and graphics sync module 618 can be stored in a database 620 and later accessed to generate a preview of the data and graphics for a layer or floorplan before final visual rendering. In some implementations, the respective outputs of the data sync module 616 and graphics sync module 618 can be provided to a rendering module 630.

The system 600 includes a rendering module 630 that leverages tile generation technology to graphically render data and graphics for layers specified by the layer mapping output. In this example, the rendering module 630 is coupled for communication with user interface 602 to provide output parameters (e.g., data and graphics elements) for graphically rendering information for a layer as a display output at the user interface 602. The rendering module 630 can include logic for tile generation 628, tile renderer 636, smart renderer 632, and robust renderer 634.

In some implementations, using outputs of the graphics sync module 618 and data sync module 616, rendering module 630 can generate a merged graphics layer 622 by overlaying dimensional coordinates of a GeoJSON file over dimensional coordinates of a SVG file or one or more images tiles generated from the SVG file. The merged graphics layer 622 can be used for presentation of the preview of the data and graphics for the layer or floorplan, presentation of a final version of the layer or floorplan, or both. In some implementations, the system 600 generates the merged graphics layer 622 based on intelligent analytics and calculations related to spatial coordinates and bounds for respective coordinate systems of the SVG file and GeoJSON file or the one or more image tiles and the GeoJSON file.

For the presentation of the merged graphics layer 622, a tile generation module 628 can generate multiple image tiles from a SVG file. The image tiles can have smaller file sizes, smaller dimensions, or both, than the SVG file. As a result, the system 600 or a device that receives the image tiles from the system 600 can require fewer resources for presentation the image tiles on the user interface 602 than if the SVG file was used for presentation of the merged graphics layer 622. For instance, when each image tile has a smaller file size, each image tile requires less memory than the memory required to store the SVG file. Further, the system 600 can send an image tile to the computing device more quickly than an SVG file because of the smaller file size.

In some implementations, a computing device that presents the user interface 602 can render the image tile more efficiently than the SVG file because of the smaller file size. When multiple image tiles depict the data for a single SVG file, the computing device can use multi-threading support, whether virtual or actual, to more quickly present the image tiles on the user interface 602 than presentation of the SVG file on the user interface 602. The computing device can use a first thread for presentation of a first image tile and a second thread for presentation of a second image tile.

The tile generation module 628 can decouple image tile generation from the graphic sync process by offloading image tile generation to a separate background process. In some implementations, the job of tile generation is performed by a server system such as the backend server system 130 of FIG. 1. The job can be submitted to the frontend server system 110 and can include an attachment identifier corresponding to the SVG file. The backend server system 130 can process the SVG file and produce image tiles. Once the tile generation module 628 finishes generation of at least some of the image tiles, the system 600 can then use the image tiles for the merged graphics layer 622, taking advantage of the smaller file sizes of the image tiles.

The smart renderer 632 can be configured to intelligently switch between non-tile SVG files and image tiles to improve presentation of the merged graphic layers 622 in the user interface 602. In some implementations, the smart renderer 632 enables the rendering module 630 to perform its rendering functions using fewer processor cycles, less memory resources, or both, when dynamic tiling functions of the smart renderer 632 are invoked at the rendering module 630. In some implementations, the smart renderer 632 can enable presentation of the merged graphics layer 622 more quickly using an SVG file than if the merged graphics layer 622 was only presented using image tiles. Hence, the smart renderer 632 can provide improved efficiency relative to other approaches for rendering graphical data at a display.

The robust renderer 634 is configured to overlay data or dimensional coordinates of the GeoJSON file on top of the data or dimensional coordinates of the SVG file, e.g., for the merged graphics layer 622. This overlay feature of the robust renderer 634 is related to the merged graphics layer 622 and intelligent analytics functions described earlier. More specifically, the robust renderer 634 can be used to execute the intelligent analytics and calculations related to spatial coordinates and bounds for respective coordinate systems of the SVG file and GeoJSON file. The robust renderer 634 allows for cooperation between, and integration of, different coordinate systems to allow for visualization of data and graphical elements of drawing layers, e.g., when data for the merged graphics layer 622 is presented on the user interface 602.

When the merged graphics layer 622 includes an interactive GeoJSON layer and multiple image tiles, a tile renderer 636 can coordinate presentation of the GeoJSON layer with the image tiles. For instance, the tile renderer 636 can obtain x-y coordinates in a CAD screen space, e.g., for the user interface 602. The tile renderer 636 can use these coordinate to align the GeoJSON layer with the image tiles. For instance, the tile renderer 636 can convert coordinates for the GeoJSON layer into coordinates for the image tiles.

Figure 7:
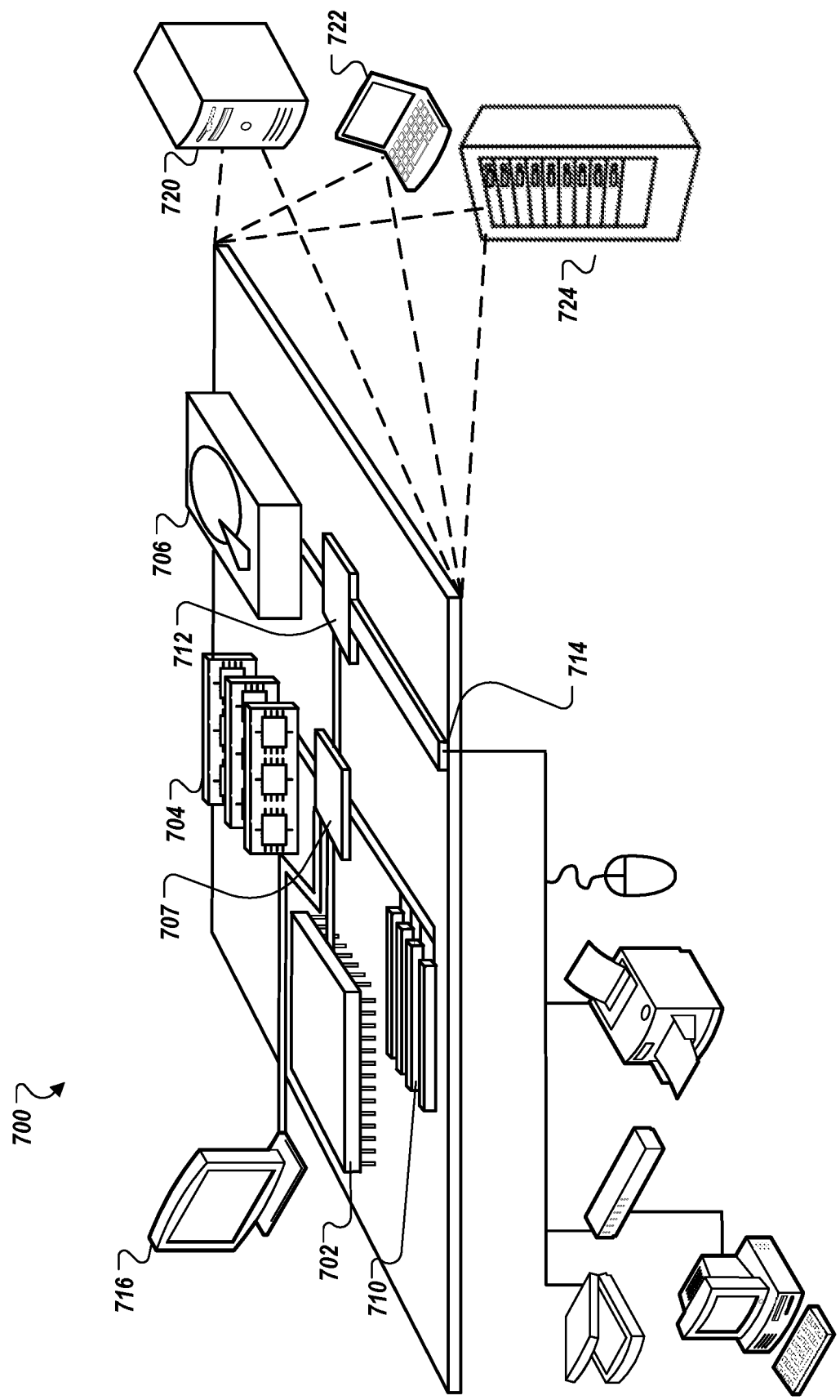
FIG. 7 shows a diagram of an example of a computing device.

FIG. 7 shows a diagram of an example of a computing device 700 which can be used to implement one or more of the systems and techniques described herein, as either a client, clients, server, servers, etc. In some implementations, the computing device 700 is referred to as a data processing apparatus. Computing device 700 is intended to represent various forms of digital computers, such as laptops, mobile devices, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 700 includes a processor 702, memory 704, a storage device 706, a high-speed interface 707 connecting to memory 704 and high-speed expansion ports 710, and a low-speed interface 712 connecting to low-speed bus 714 and storage device 706. Each of the components 702, 704, 706, 707, 710, and 712, are interconnected using various busses, and can be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high-speed interface 707. In other implementations, multiple processors and/or multiple buses can be used, as appropriate, along with multiple memories and types of memory. Also, multiple computing devices 700 can be connected, with each device providing portions of the necessary operations (e.g., as a server bank, a group of blade servers, or a multi-processor system).

The memory 704 stores information within the computing device 700. In one implementation, the memory 704 includes a computer-readable medium such as a flash memory. In one implementation, the memory 704 includes a volatile memory unit or units such as RAM. In another implementation, the memory 704 includes a non-volatile memory unit or units.

The storage device 706 is capable of providing mass storage for the computing device 700. In one implementation, the storage device 706 is a computer-readable medium such as a hard drive or solid state drive. In various different implementations, the storage device 706 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above.

The high-speed interface 707 manages bandwidth-intensive operations for the computing device 700, while the low speed controller 712 manages lower bandwidth-intensive operations. Such allocation of duties is exemplary only. In one implementation, the high-speed controller 707 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which can include various communication ports (e.g., universal serial bus (USB), Bluetooth, Ethernet, wireless Ethernet) can be coupled to one or more input/output devices, such as a keyboard, a pointing device, a scanner, or a networking device such as a switch or router, e.g., through a network adapter.

The computing device 700 can be implemented in a number of different forms, as shown in the figure. For example, it can be implemented as a server 720, or multiple times in a group of such servers. It may also be implemented as part of a rack server system 724. In addition, it can be implemented in a personal computer such as a laptop computer 722.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; USB drive, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the inventions have been described. Other embodiments are within the scope of the following claims. In addition, actions recited in the claims can be performed in a different order and still achieve desirable results.

What is claimed is:

1. A computer-implemented method comprising:
   obtaining, from a first server system, a job record from a job queue;
   assigning a node associated with a second server system to handle a task indicated by the job record;
   operating, at the second server system, a first action block in the node to produce a plurality of output results in response to executing the task and to forward the plurality of output results to batch blocks;
   operating, at the second server system, the batch blocks in the node to respectively accumulate batch groups of the output results, the batch groups being formed based on a mapping template that defines protocols for aggregating sets of the output results, the sets of the output results corresponding to different respective layers;
   operating, at the second server system, the batch blocks in the node to forward, to second action blocks, the batch groups of the output results meeting a predetermined data amount threshold, each of the batch blocks transmitting the output results to a respective second action block of the second action blocks that responded to a polling action by indicating an availability to process the batch groups of the output results; and
   operating, at the second server system, the second action blocks in the node to respectively process the batch groups of the output results.

2. The computer-implemented method of claim 1, wherein the batch groups of the output results are first batch groups of the output results, wherein the method comprises:
   operating, at the second server system, the batch blocks in the node to respectively accumulate different second batch groups of the output results;
   operating, at the second server system, the batch blocks in the node to respectively forward the different second batch groups of the output results to the second action blocks; and
   operating, at the second server system, the second action blocks in the node to respectively process the different second batch groups of the output results.

3. The computer-implemented method of claim 2, comprising:
   operating, at the second server system, the batch blocks to generate a signal to throttle forwarding of output results from the plurality of output results from the first action block.

4. The computer-implemented method of claim 3, wherein the signal is generated based on forwarding a predetermined number of output results to a second action block.

5. The computer-implemented method of claim 1, wherein operating the second action blocks in the node to respectively process the batch groups of the output results comprises operating the second action blocks to respectively upload the batch groups of the output results to a data store associated with the first server system.

6. The computer-implemented method of claim 1, wherein the job record comprises an attachment identifier, wherein the method comprises:
   operating, at the second server system, the first action block in the node to retrieve one or more files associated with the attachment identifier.

7. The computer-implemented method of claim 1, comprising:
   operating, at the second server system, a link block in the node to copy the plurality of output results from the first action block to the batch blocks.

8. A non-transitory computer-readable storage medium comprising a program for execution by a processor of a device, the program including instructions which, when executed by the processor, cause the device to perform operations comprising:
   obtaining, from a first server system, a job record from a job queue;
   assigning a node associated with a second server system to handle a task indicated by the job record;
   operating, at the second server system, a first action block in the node to produce a plurality of output results in response to executing the task and to forward the plurality of output results to batch blocks;
   operating, at the second server system, the batch blocks in the node to respectively accumulate batch groups of the output results, the batch groups being formed based on a mapping template that defines protocols for aggregating sets of the output results, the sets of the output results corresponding to different respective layer;

operating, at the second server system, the batch blocks in the node to forward, to second action blocks, the batch groups of the output results meeting a predetermined data amount threshold, each of the batch blocks transmitting the output results to a respective second action block of the second action blocks that responded to a polling action by indicating an availability to process the batch groups of the output results; and operating, at the second server system, the second action blocks in the node to respectively process the batch groups of the output results.

9. The non-transitory computer-readable storage medium of claim 8, wherein the batch groups of the output results are first batch groups of the output results, wherein the operations comprise:

operating, at the second server system, the batch blocks in the node to respectively accumulate different second batch groups of the output results;

operating, at the second server system, the batch blocks in the node to respectively forward the different second batch groups of the output results to the second action blocks; and operating, at the second server system, the second action blocks in the node to respectively process the different second batch groups of the output results.

10. The non-transitory computer-readable storage medium of claim 9, wherein the operations comprise:

operating, at the second server system, the batch blocks to generate a signal to throttle forwarding of output results from the plurality of output results from the first action block.

11. The non-transitory computer-readable storage medium of claim 10, wherein the signal is generated based on forwarding a predetermined number of output results to a second action block.

12. The non-transitory computer-readable storage medium of claim 8, wherein operating the second action blocks in the node to respectively process the batch groups of the output results comprises operating the second action blocks to respectively upload the batch groups of the output results to a data store associated with the first server system.

13. The non-transitory computer-readable storage medium of claim 8, wherein the job record comprises an attachment identifier, wherein the operations comprise:

operating, at the second server system, the first action block in the node to retrieve one or more files associated with the attachment identifier.

14. The non-transitory computer-readable storage medium of claim 8, wherein the operations comprise:

operating, at the second server system, a link block in the node to copy the plurality of output results from the first action block to the batch blocks.

15. A system comprising:
a processor; and
a computer-readable storage medium coupled with the processor, wherein the computer-readable storage medium comprising a program for execution by the processor, the program including instructions which, when executed by the processor, cause the processor to perform operations comprising:

obtaining a job record from a job queue;

assigning a node to handle a task indicated by the job record;

operating a first action block in the node to produce a plurality of output results in response to executing the task and to forward the plurality of output results to batch blocks;

operating the batch blocks in the node to respectively accumulate batch groups of the output results, the batch groups being formed based on a mapping template that defines protocols for aggregating sets of the output results, the sets of the output results corresponding to different respective layer;

operating the batch blocks in the node to forward, to second action blocks, the batch groups of the output results meeting a predetermined data amount threshold, each of the batch blocks transmitting the output results to a respective second action block of the second action blocks that responded to a polling action by indicating an availability to process the batch groups of the output results; and operating the second action blocks in the node to respectively process the batch groups of the output results.

16. The system of claim 15, wherein the batch groups of the output results are first batch groups of the output results, wherein the operations comprise:

operating the batch blocks in the node to respectively accumulate different second batch groups of the output results;

operating the batch blocks in the node to respectively forward the different second batch groups of the output results to the second action blocks; and operating the second action blocks in the node to respectively process the different second batch groups of the output results.

17. The system of claim 16, wherein the operations comprise:

operating the batch blocks to generate a signal to throttle forwarding of output results from the plurality of output results from the first action block.

18. The system of claim 17, wherein the signal is generated based on forwarding a predetermined number of output results to a second action block.

19. The system of claim 15, wherein operating the second action blocks in the node to respectively process the batch groups of the output results comprises operating the second action blocks to respectively upload the batch groups of the output results to a data storage system.

20. The system of claim 15, wherein the job record comprises an attachment identifier, wherein the operations comprise:

operating the first action block in the node to retrieve one or more files associated with the attachment identifier.

21. The system of claim 15, wherein the operations comprise:

operating a link block in the node to copy the plurality of output results from the first action block to the batch blocks.

* * * * *